United States Patent [19]

Smith et al.

[11] Patent Number: 5,800,116
[45] Date of Patent: Sep. 1, 1998

[54] AUGER ASSEMBLY FOR CONVEYING GRANULAR MATERIAL

[75] Inventors: David R. Smith; Steven R. Hilvers, both of Ft. Jennings, Ohio

[73] Assignee: Unverferth Manufacturing Co., Inc., Kalida, Ohio

[21] Appl. No.: 658,675

[22] Filed: Jun. 4, 1996

[51] Int. Cl.$^6$ ........................................ B60P 1/40
[52] U.S. Cl. .................. 414/523; 198/550.1; 414/526
[58] Field of Search ........................ 414/526, 523, 414/504, 505, 326; 198/550.1, 861.4

[56] References Cited

U.S. PATENT DOCUMENTS

| | | | |
|---|---|---|---|
| 2,507,873 | 5/1950 | Ward | 414/288 X |
| 2,541,984 | 2/1951 | Chandler | 414/523 X |
| 2,585,414 | 2/1952 | Steffens | 414/526 X |
| 2,751,097 | 6/1956 | Miller | 414/523 X |
| 3,057,522 | 10/1962 | Reed | 414/326 X |
| 3,334,760 | 8/1967 | Bolinger et al. | 414/526 X |
| 3,342,355 | 9/1967 | Lasiter | 414/526 X |
| 3,498,483 | 3/1970 | Meharry | 414/523 |
| 3,575,306 | 4/1971 | Obermeyer et al. | 414/523 |
| 3,642,155 | 2/1972 | Carlson | 414/504 X |
| 4,422,767 | 12/1983 | Yelton | 414/505 X |
| 4,613,275 | 9/1986 | Karlowsky | 414/526 X |
| 4,714,398 | 12/1987 | Rohwedder | 414/526 X |
| 4,781,513 | 11/1988 | Ajorgren et al. | 414/526 X |
| 5,009,254 | 4/1991 | Bruner | 414/526 X |
| 5,551,776 | 9/1996 | Zimmerman | 414/523 X |
| 5,615,990 | 4/1997 | Grieshop . | |
| 5,628,608 | 5/1997 | Linscheid et al. | 414/526 |

OTHER PUBLICATIONS

"M&W Little Red Wagon", M&W Gear Company, Gibson City, IL 60936, undated.

"Gravity Box/Tailgate Auger", United Farm Tools, Inc., South Charleston, WV 25309, undated.

"Killbros Hydraulic Auger Conveyors", Kill Brothers Co., Delphos, OH 45833, undated.

"Westfield Utility Augers", Westfield Industries, Inc., Rosenort, Manitoba, Canada ROG 1W0 (1988).

"J&M Hydraulic Auger", J&M Manufacturing Company, Ft. Recovery, OH 45846, undated.

"J&M Uni–swivel Hydraulic Augers", J&M Manufacturing Company, Ft. Recovery, OH 45846, undated.

"J&M Hydraulic Augers", J&M Manufacturing Company, Ft. Recovery, OH 45846, undated.

"Hydra", Hydra–Fold Auger, Inc., Paxton, IL 60957, undated.

"Unverferth Grain Handling Systems", Unverferth Manufacturing Company, Inc., Kalida, OH 45853, undated.

Primary Examiner—David A. Bucci
Attorney, Agent, or Firm—Rothwell, Figg, Ernst & Kurz, p.c.

[57] ABSTRACT

A gravity box grain cart has an auger assembly for conveying granular material. The auger assembly includes an auger with an axis and a helical flight along the axis, with the auger having a feed end, a discharge end and a central auger section therebetween. A cylindrical auger tube surrounds at least the central auger section, and the feed end of the auger extends outwardly from the tube. A sump for granular material is connected to the auger tube and surrounds the feed end of the auger. The auger, auger tube and sump are pivotable about approximately the feed end of the auger in approximately a first plane. The auger, auger tube and sump are further pivotable about approximately the feed end of the auger in a second plane approximately perpendicular to the first plane. The sump has a diameter through the axis of the auger which is about perpendicular to the second plane, and which is at least about 40–100% larger than the diameter of the auger tube.

14 Claims, 4 Drawing Sheets

5,800,116

AUGER ASSEMBLY FOR CONVEYING GRANULAR MATERIAL

BACKGROUND OF THE INVENTION

1. Field of the Invention

The present invention relates to an auger assembly for conveying granular material.

2. Description of the Background Art

Auger-type screw conveyors are well known in the art, examples of which are disclosed in U.S. Pat. Nos. 2,507,873, 2,541,984, 3,057,522, 4,613,275 and 5,009,254.

It is also known to mount an auger on an agricultural grain gravity box so as to provide an auger-unloadable grain cart or wagon.

There remains a need in the art for improvements in auger-type screw conveyors and augers for grain carts or wagons.

SUMMARY OF THE INVENTION

In accordance with the present invention, an auger assembly for conveying granular material comprises an auger with an axis and a helical flight along the axis. The auger has a feed end, a discharge end and a central auger section between the feed end and the discharge end. A cylindrical auger tube having a diameter and surrounding at least the central auger section is provided, wherein the feed end of the auger extends outwardly from the tube. A sump for the granular material is connected to the auger tube and surrounds the feed end of the auger. A first pivot assembly is provided for pivoting the auger, auger tube and sump about approximately the feed end of the auger in approximately a first plane. A second pivot assembly is provided for pivoting the auger, the auger tube and the sump about approximately the feed end of the auger in a second plane approximately perpendicular to said first plane. The sump has a diameter through the axis of the auger which is about perpendicular to the second plane, and which is at least about 40–100% larger than the diameter of the auger tube. The invention is further directed to a gravity box grain cart and auger assembly as described above, the grain cart including a hopper for holding grain, wheels connected to the hopper for transporting the cart over a surface, and a discharge opening in a bottom portion of the hopper for discharging grain from the hopper.

DETAILED DESCRIPTION OF THE PREFERRED EMBODIMENTS

Figure 1:
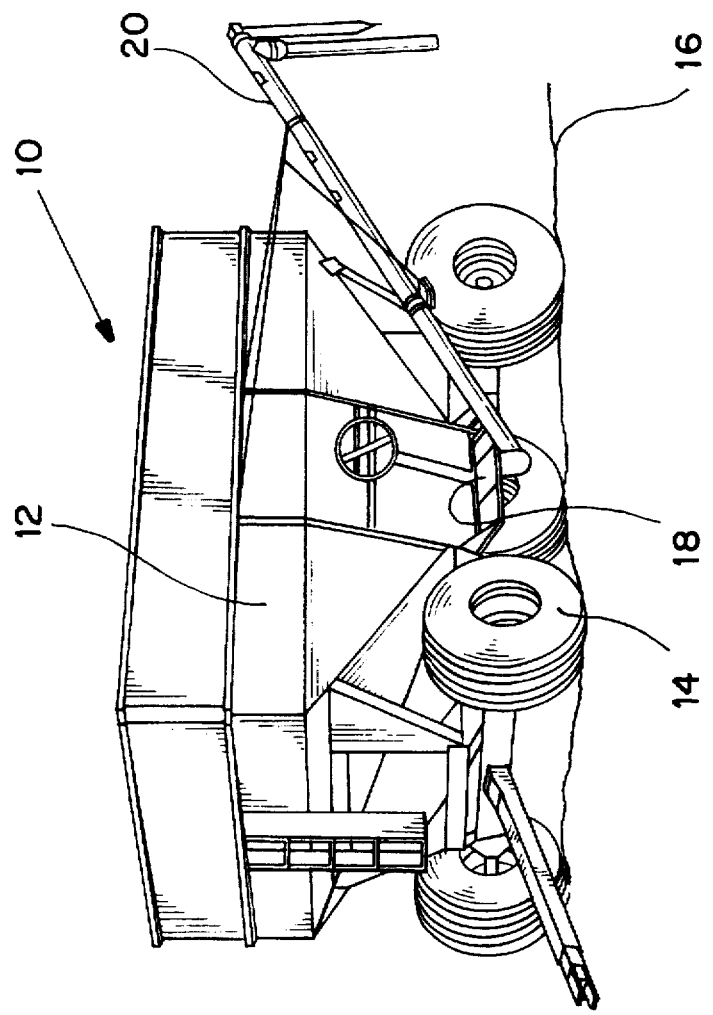
FIG. 1 is a perspective view of a gravity box grain cart with auger assembly in accordance with one embodiment of the invention.

FIG. 1 shows a gravity box grain cart and auger assembly in accordance with one embodiment of the invention. This embodiment includes a gravity box grain cart 10 including a hopper 12 for holding granular materials such as grain. Wheels 14 are connected to the hopper for transporting cart 10 over a surface 16. A discharge opening 18 is provided in a bottom portion of hopper 12 for discharging grain from the hopper.

An auger assembly 20 in accordance with the invention is shown mounted on grain cart 10 in FIG. 1.

Figure 3:
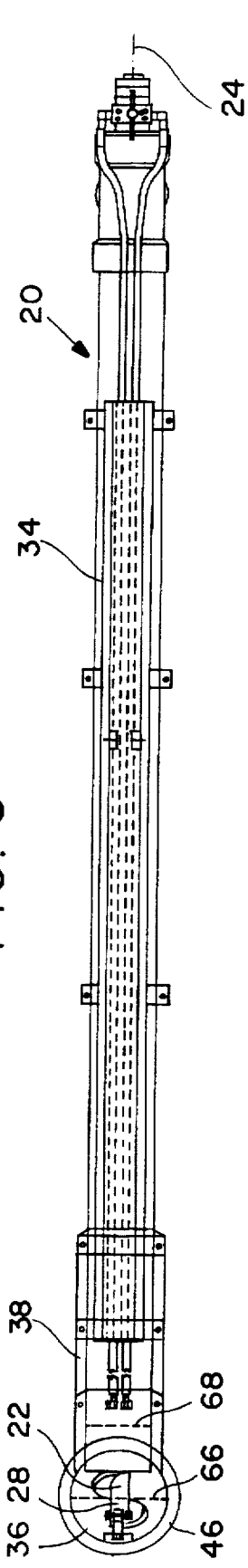
FIG. 3 is a top elevational view of the auger assembly portion shown in FIG. 2.
Figure 2:
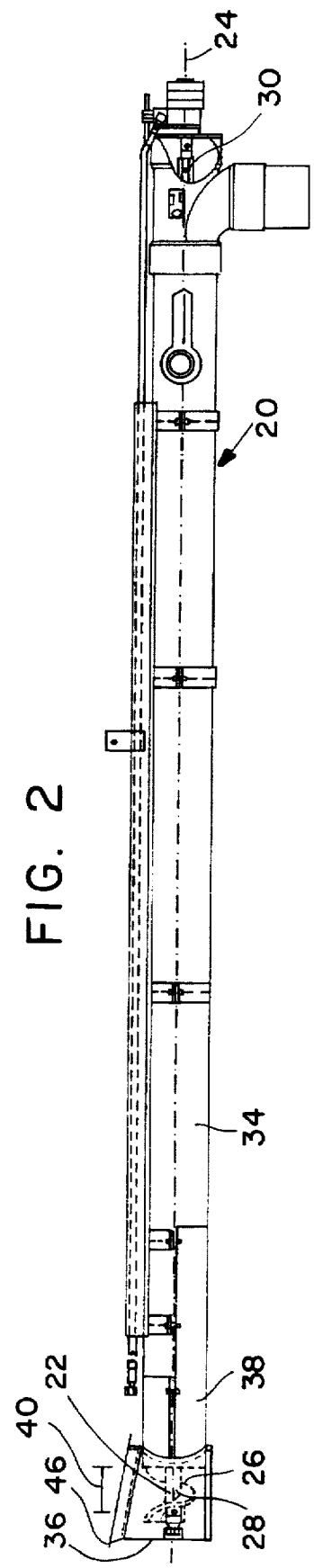
FIG. 2 is a side elevational view of part of an auger assembly in accordance with the present invention, with portions broken away.

As shown in FIGS. 2 and 3, an auger assembly 20 in accordance with the present invention includes an auger 22 with an axis 24 and a helical flight 26.

Figure 4:
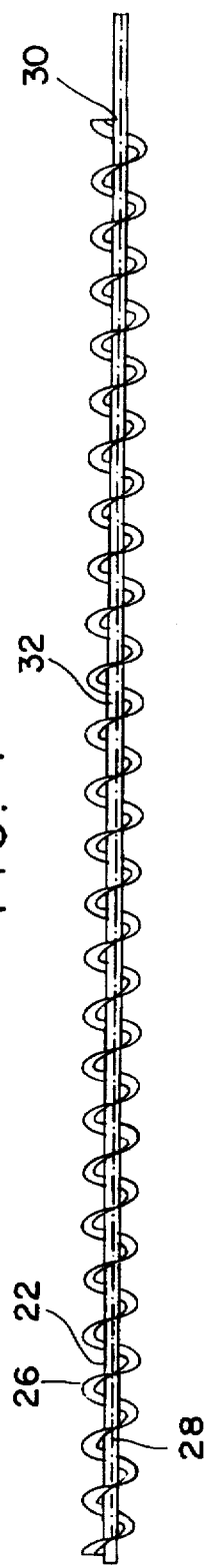
FIG. 4 is an elevational view of an auger removed from the auger assembly portion shown in FIGS. 2 and 3.

Auger 22 has a feed end 28 shown in FIGS. 2, 3 and 4, and a discharge end 30 shown in FIGS. 2 and 4. As shown in FIG. 4, a central auger section 32 is located between the feed end 28 and the discharge end 30 of auger 22.

A cylindrical auger tube 34 surrounds at least the central auger section 32 of auger 22, and in the embodiment shown in FIGS. 2 and 3, surrounds the central auger section 32 and the discharge end of the auger 30.

As shown in FIGS. 2 and 3, the feed end 28 of auger 22 extends outwardly from tube 34.

In accordance with the present invention, a sump 36 is provided for efficiently directing granular material toward the feed end 28 of auger 22. As can be seen in FIGS. 2 and 3, sump 36 is connected to the auger tube 34 by means of a split clamp and screw assembly 38. A sump 36 surrounds the feed end 28 of auger 22.

In the embodiment shown in FIG. 2, at least approximately a complete wave cycle 40 of helical flight 26 at the feed end 28 of auger 22 extends outwardly from tube 34 and is surrounded by sump 36.

Figure 5:
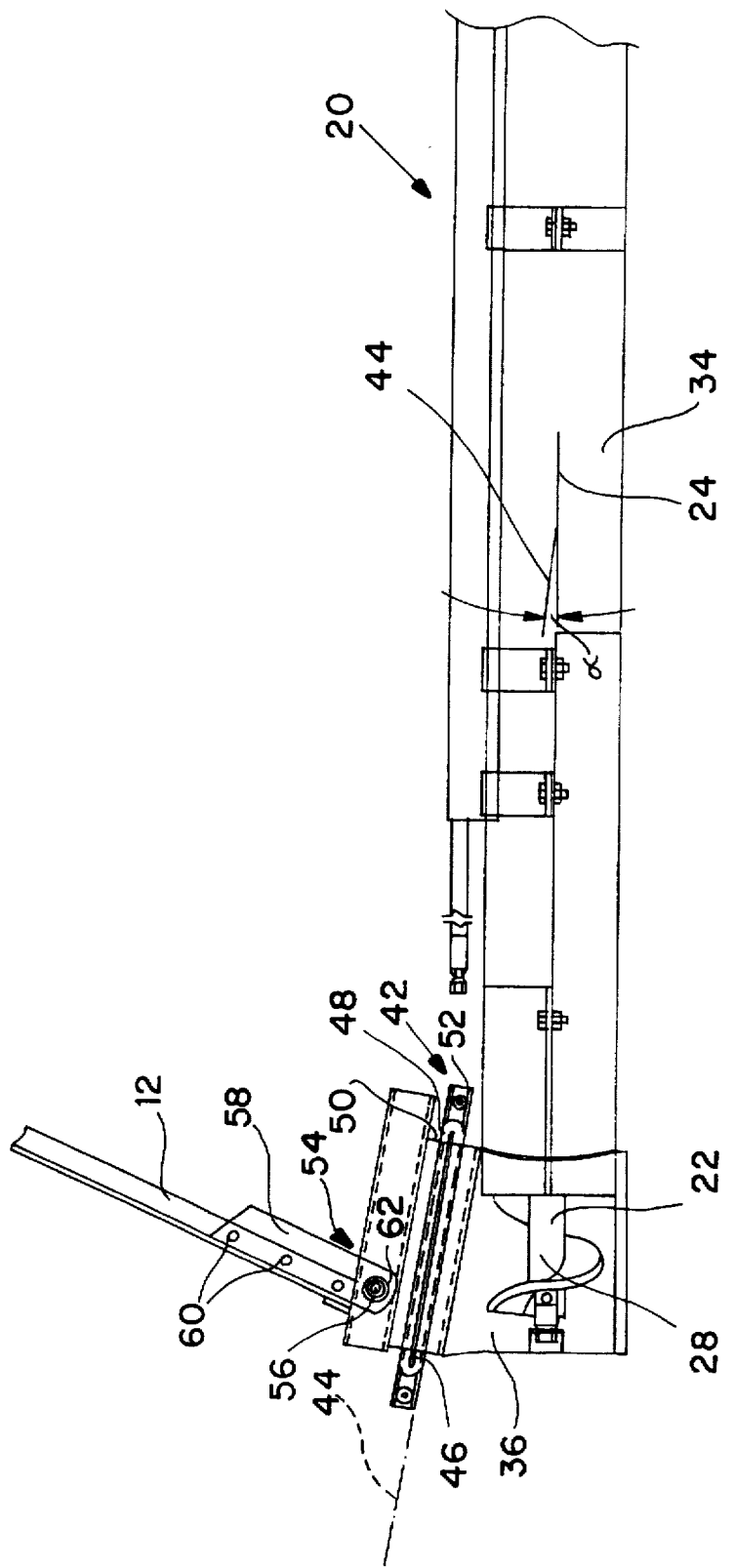
FIG. 5 is a side elevational view of an auger assembly in accordance with the present invention, with portions broken away, connected to a hopper.

With reference to FIG. 5, the embodiment shown includes a first pivot assembly 42 for pivoting the auger 22, auger tube 34 and sump 36 about approximately the feed end 28 of auger 22 in approximately a first plane 44.

In preferred embodiments, the first plane 44 is at an angle of from about 0°–20° with respect to axis 24 of auger 22. In the embodiment shown in FIG. 5, the first plane 44 is at an angle α of about 10° with respect to axis 24 of auger 22.

In the embodiment shown, the first pivot assembly 42 includes a first rotatable collar 46 connected to sump 36 by any suitable means, such as welding. Collar 46 has a corresponding rotatable collar 48 connected to an auger support member 50 by any suitable means, such as welding. Rotatable collars 46 and 48 are held together by a clamp assembly 52 which permits rotation of the auger assembly 20 in approximately plane 44.

In the embodiment shown, a second pivot assembly 54 is provided. The second pivot assembly 54 includes a pair of pivot bearings 56, one of which is shown in FIG. 5, and the pair of which is shown in FIGS. 6 and 7.

The second pivot assembly 54 includes a pair of hinge brackets 58, one shown in FIG. 5, which are connected to hopper 12 by any suitable means such as bolts 60. Hinge brackets 58 include corresponding openings 62 (one shown in FIG. 5) within which pivot bearings 56 rotate.

Figure 6:
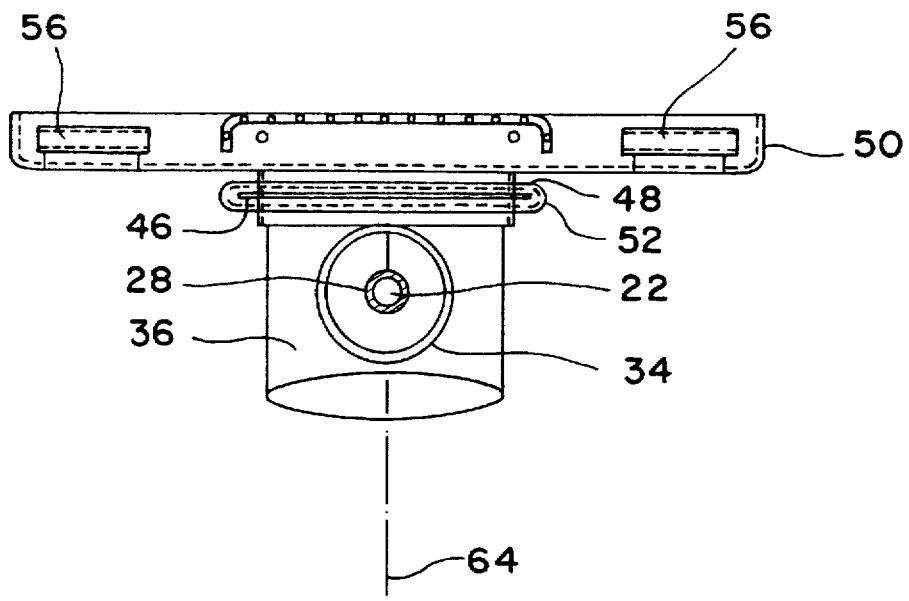
FIG. 6 is a front elevational view, with portions broken away, of an auger assembly in accordance with the present invention.
Figure 7:
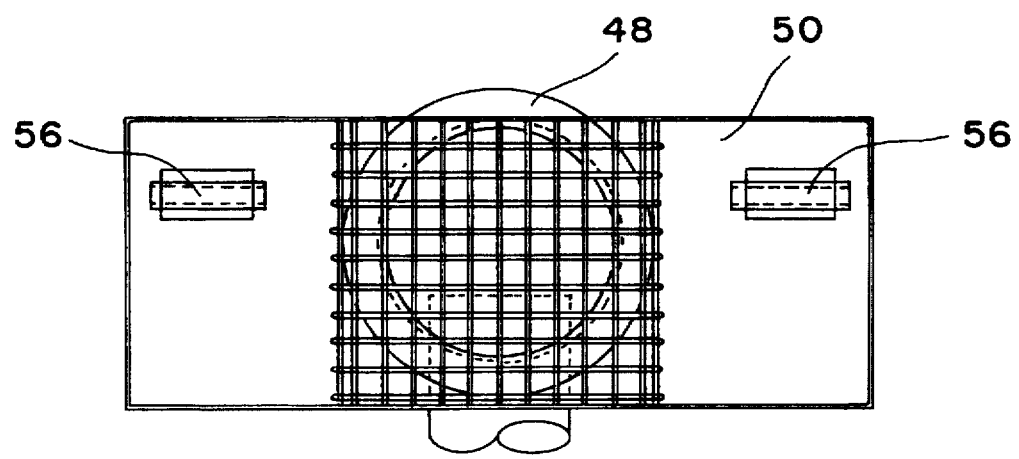
FIG. 7 is a top elevational view of an auger assembly of the present invention, with portions broken away.

The second pivot assembly 54 permits the auger 22, auger tube 34 and sump 36 to pivot about approximately the feed end 28 of auger 22 in a second plane 64, shown in FIG. 6. The second plane 64, shown in FIG. 6, is approximately perpendicular to the first plane 44 shown in FIG. 5.

As can be seen clearly in FIG. 3, in the embodiment shown, sump 36 has a substantially cylindrical cross-section in a direction approximately perpendicular to axis 24 of auger 22. The cylindrical sump has a diameter 66 which is at least about 40–100% larger than the diameter 68 of auger tube 34. In preferred embodiments, the diameter 66 of sump 36 is at least about 50% larger than the diameter 68 of tube 34, and in particularly preferred embodiments, the diameter 66 of sump 36 is about 50–75% larger than the diameter 68 of tube 34.

A screen 70 is provided for facilitating even flow of material into the sump 36.

The present invention provides a gravity box grain cart and auger assembly with several advantages over the prior art. The sump of the present invention provides an advantage in the amount of material that can be moved through the auger in a given time period, which may be increased by as much as 50% over conventional augers. Furthermore, the first and second pivot assemblies provide rotational capabilities in perpendicular planes for easy positioning of the auger to unload grain at desired locations.

Because many modifications, variations and changes in detail may be made to the described embodiments, it is intended that all matter in the foregoing description and shown in the accompanying drawings be interpreted as illustrative and not in a limiting sense.

We claim:

1. An auger assembly for conveying granular material, comprising:
   a) an auger with an axis and a helical flight along said axis, and having a feed end, a discharge end and a central auger section between the feed end and the discharge end of said auger;
   b) a cylindrical auger tube having a diameter and surrounding at least the central auger section of said auger, wherein said feed end of said auger extends outwardly from said tube;
   c) a generally cylindrical sump for said granular material connected to said auger tube and surrounding said feed end of said auger;
   d) a first pivot assembly for pivoting said auger, said auger tube and said sump about approximately the feed end of said auger in approximately a first plane;
   e) a second pivot assembly for pivoting said auger, said auger tube and said sump about approximately the feed end of said auger in a second plane approximately perpendicular to said first plane; and
   f) said sump having a cylinder diameter, measured in a direction perpendicular to said axis and about perpendicular to said second plane, which is at least about 40–100% larger than the diameter of said auger tube.

2. The assembly of claim 1, wherein said sump has a substantially cylindrical cross-section in a direction substantially perpendicular to said axis, and wherein the sump diameter is at the cylindrical cross-section of said sump.

3. The assembly of claim 1, wherein at least approximately a complete wave cycle of said helical flight at said feed end extends outwardly from said tube and is surrounded by said sump.

4. The assembly of claim 1, wherein the sump diameter is at least about 50% larger than the diameter of said auger tube.

5. The assembly of claim 4, wherein the sump diameter is about 50–75% larger than the diameter of said auger tube.

6. The assembly of claim 1, wherein said first plane is at an angle of from about 0°–20° with respect to said axis.

7. The assembly of claim 6, wherein said angle is about 10°.

8. A gravity box grain cart and auger assembly, comprising:
   a) a gravity box grain cart including a hopper, wheels connected to the hopper for transporting the cart over a surface, and a discharge opening in a bottom portion of the hopper; and
   b) an auger assembly, for conveying granular material, comprising:
      1) an auger with an axis and a helical flight along said axis, and having a feed end, a discharge end and a central auger section between the feed end and the discharge end of said auger;
      2) a cylindrical auger tube having a diameter and surrounding at least the central auger section of said auger, wherein said feed end of said auger extends outwardly from said tube;
      3) a generally cylindrical sump for said granular material connected to said auger tube and surrounding said feed end of said auger;
      4) a first pivot assembly for pivoting said auger, said auger tube and said sump about approximately the feed end of said auger in approximately a first plane;
      5) a second pivot assembly for pivoting said auger, said auger tube and said sump about approximately the feed end of said auger in a second plane approximately perpendicular to said first plane; and
      6) said sump having a cylinder diameter, measured in a direction perpendicular to said axis and about perpendicular to said second plane, which is at least about 40–100% larger than the diameter of said auger tube;

wherein the sump of said auger assembly is connected to the discharge opening of said hopper.

9. The assembly of claim 8, wherein said sump has a substantially cylindrical cross-section in a direction substantially perpendicular to said axis, and wherein the sump diameter is at the cylindrical cross-section of said sump.

10. The assembly of claim 8, wherein at least approximately a complete wave cycle of said helical flight at said feed end extends outwardly from said tube and is surrounded by said sump.

11. The assembly of claim 8, wherein the sump diameter is at least about 50% larger than the diameter of said auger tube.

12. The assembly of claim 11, wherein the sump diameter is about 50–75% larger than the diameter of said auger tube.

13. The assembly of claim 8, wherein said first plane is at an angle of from about 0°–20° with respect to said axis.

14. The assembly of claim 13, wherein said angle is about 10°.

* * * * *